Figures 1, 2:
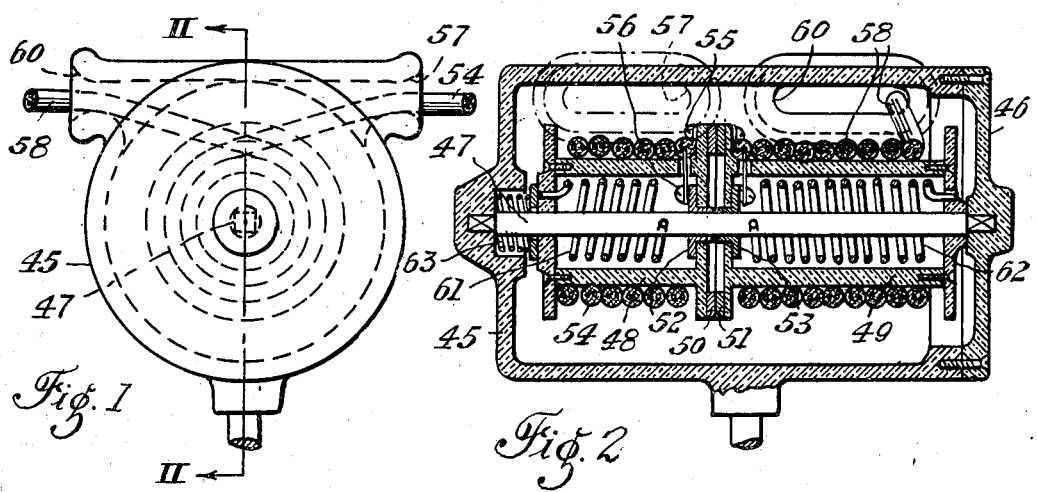

Aug. 15, 1939.   D. HOPPENSTAND   2,169,734
CORD RETRIEVER
Filed July 22, 1937

David Hoppenstand
INVENTOR.

BY Stebbins, Blenko & Parmelee
ATTORNEYS.

Patented Aug. 15, 1939

2,169,734

UNITED STATES PATENT OFFICE 2,169,734

CORD RETRIEVER

David Hoppenstand, Fox Chapel, Pa.

Application July 22, 1937, Serial No. 154,975

2 Claims. (Cl. 191—12.2)

This invention relates to a device for taking up the slack in extension cords used with various electrical appliances, such as electric irons, vacuum cleaners, telephones, etc.

While numerous devices of this kind have been proposed heretofore, none of them so far as I am aware has provided a satisfactory solution to the problem of disposing of excess slack in extension cords, while permitting them to be pulled out to the desired length as needed. My invention provides a simple, relatively inexpensve, yet highly effective means of accomplishing this result.

In accordance with the invention, I provide a casing which is preferably of molded material having cord openings on opposite sides thereof and a takeup reel journaled therein. Spring return means associated with the reel causes it to wind up the slack in the cord when not needed.

A complete understanding of the invention may be gained from the following detailed description thereof, which is to be read in connection with the accompanying drawing.

In the drawing Fig. 1 is a side elevation of one form of the invention; and

Fig. 2 is a sectional view taken along the line II—II of Fig. 1.

A casing 45 of insulatng material is provided with a removable cover 46 and a shaft 47. Reels 48 and 49 are journaled on the shaft. The reels have slip rings 50 and 51 making sliding contact with each other. Reel 48 has a bushing 52 and reel 49 a bushing 53, both of which turn on the shaft 47 and make electrical contact therewith.

A cord 54 on the reel 48 has one of its conductors connected to the slip ring 50 by a screw 55 the other being connected to the bushing 52 by screw 56. The free end of the cord 54 is drawn out through an opening 57 in the casing.

A cord 58 is similarly disposed on the reel 59 and connected to the slip ring 51 and bushing 53 thereof, the free end being passed out through an opening 60 in the casing. Coil springs 61 and 62 are secured to the reels 48 and 49 and the shaft 47 to cause the reels to take up any slack in the cords. The springs are wound up as the cords are pulled out.

The cord 54 may be connected to an outlet receptacle and cord 58 to an appliance or vice-versa. By virtue of the construction described, the appliance may be moved about within a relatively wide area, and the distance of the retriever from the receptacle may likewise be varied to suit the conditions. This construction thus serves a wide range of usefulness by disposing not only of the slack between the retriever and the appliance, but also that between the retriever and the receptacle. A spring 63 urges the reel 48 toward the reel 49 to insure good contact between the rings 50 and 51 at all times.

The bushings 52 and 53 are electrically connected by virtue of their contact with the shaft 47 which is of conducting material. The circuit from the cord connected to the outlet receptacle is thus connected on one side through the bushings and shaft and on the other through the slip rings 50 and 51 to the cord connected to the appliance.

It will be apparent from the foregoing description that the invention provides a simple yet highly satisfactory and efficient cord retriever adapted to a wide variety of uses. It will be understood, of course, that the showing of the several figures of the drawing is purely illustrative and in nowise is to be construed as a limitation on the scope of the invention, the novel features of which are particularly pointed out in the following claims in accordance with the patent statutes. While I have shown a two-conductor cord coiled on a reel of a retriever, it is obvious that cords having a greater number of conductors may be employed as well, for appliances requiring a larger number of circuits.

I claim:

1. A cord retriever comprising a unitary casing, a cover removably secured to one end of said casing, a shaft of conducting material journaled in said casing and cover, a reel rotatable on said shaft, a cable coiled on said reel, a slip ring of conducting material on said reel and insulated from said shaft, and means on said reel composed of conducting material but insulated from said slip ring, having sliding contact with said shaft, the conductors of said cable being connected respectively to said slip ring and to said means, and a second reel similar to that first mentioned, rotatably mounted on said shaft having a cable thereon similarly connected thereto, said casing enclosing both reels, and means for urging one reel toward the other to maintain the slip rings of the two reels in contact with each other.

2. A cord retriever comprising a unitary casing, a cover removably secured to one end of said casing, said cover and casing being composed of insulating material, a shaft of conducting material journaled in said casing and cover, a reel of insulating material rotatably mounted on said shaft, a cable coiled on said reel, a slip ring of conducting material mounted on said reel coaxially thereof and spaced from said shaft, means on said reel composed of conducting material having sliding contact with said shaft, the conductors of said cable being connected respectively to said slip ring and to said means, and a second reel similar to that first mentioned, rotatably mounted on said shaft and having a cable thereon similarly connected thereto, said casing enclosing both reels, and means for urging one reel toward the other to maintain the slip rings of the two reels in contact with each other.

DAVID HOPPENSTAND.